(12) United States Patent
Slocum (10) Patent No.: US 7,117,164 B2
(45) Date of Patent: Oct. 3, 2006

(54) SYSTEM AND METHOD OF DEMAND PLANNING FOR INTERMEDIATE AND BY-PRODUCTS

(75) Inventor: Gregory H. Slocum, Dallas, TX (US)

(73) Assignee: i2 Technologies US, Inc., Dallas, TX (US)

( * ) Notice: Subject to any disclaimer, the term of this patent is extended or adjusted under 35 U.S.C. 154(b) by 935 days.

(21) Appl. No.: 09/771,207

(22) Filed: Jan. 26, 2001

(65) Prior Publication Data

US 2002/0103686 A1 Aug. 1, 2002

(51) Int. Cl.
G06F 17/30 (2006.01)
(52) U.S. Cl. ........................................................ 705/10
(58) Field of Classification Search ............... 705/10, 705/22, 28; 700/100
See application file for complete search history.

(56) References Cited

U.S. PATENT DOCUMENTS

| | | | | |
|---|---|---|---|---|
| 4,547,263 A | * | 10/1985 | Quame | 162/14 |
| 4,646,238 A | * | 2/1987 | Carlson et al. | 700/95 |
| 5,603,070 A | * | 2/1997 | Cerutti et al. | 419/6 |
| 5,819,232 A | * | 10/1998 | Shipman | 705/8 |
| 5,854,746 A | * | 12/1998 | Yamamoto et al. | 700/106 |
| 5,953,707 A |   | 9/1999  | Huang et al. | 705/10 |
| 6,054,074 A | * | 4/2000  | Wu et al. | 264/37.29 |
| 6,138,103 A | * | 10/2000 | Cheng et al. | 705/7 |
| 6,151,582 A |   | 11/2000 | Huang et al. | 705/10 |
| 6,190,636 B1 | * | 2/2001 | Khan et al. | 423/499.4 |
| 6,205,431 B1 | * | 3/2001 | Willemain et al. | 705/10 |
| 6,393,332 B1 | * | 5/2002 | Gleditsch et al. | 700/99 |
| 6,535,773 B1 | * | 3/2003 | Tsukishima et al. | 700/99 |
| 6,611,726 B1 | * | 8/2003 | Crosswhite | 700/99 |
| 6,865,542 B1 | * | 3/2005 | Cox et al. | 705/10 |
| 2002/0072956 A1 | * | 6/2002 | Willems et al. | 705/10 |
| 2002/0169657 A1 | * | 11/2002 | Singh et al. | 705/10 |
| 2002/0188499 A1 | * | 12/2002 | Jenkins et al. | 705/10 |

OTHER PUBLICATIONS

Littman, Michael Lederman, Algorithms for sequential decision-making Brown University, 1996, 263 pages.*

Richard B. Chase, Nicholas J. Aquilano, Production and Operations Management: Manufacturing and Services Irwin Professional Publishing; 7th edition, Apr. 1995, ISBN: 0256140235, Chapters 7, 13-15.*

Richard B. Chase, Nicholas J. Aquilano, Production and Operations Management: Manufacturing and ServicesIrwin Professional Publishing; 7th edition, Apr. 1995, ISBN: 0256140235, pp. 544-549, 586-613, 618-622, and 770-781.*

(Continued)

Primary Examiner—Tariq R. Hafiz
Assistant Examiner—Scott L. Jarrett
(74) Attorney, Agent, or Firm—James E. Walton (57) ABSTRACT

A system (100) for demand planning includes memory (116) containing a value representing a demand quantity of at least one end product that a manufacturer (102) is to produce. Production of the demand quantity of the end product includes production of a quantity of at least one intermediate product that is to be further processed to produce the end product. The system (100) also includes one or more processors (114) collectively operable to determine a value representing an additional quantity of the intermediate product that the manufacturer (102) can produce in addition to the quantity of the intermediate product used to produce the end product. The one or more processors (114) are also collectively operable to make the additional quantity value for the intermediate product available for use in generating additional demand for the intermediate product.

12 Claims, 2 Drawing Sheets

OTHER PUBLICATIONS

William L. Leffler, Petroleum Refining in Nontechnical Language Pennwell Books; 3rd edition, Feb. 2000, ISBN: 0878147764.*

Robert E. Maples, Petroleum Refinery Process Economics Pennwell Books, 2nd edition, May 2000, ISBN: 0878147799.*

James G. Speight, The Chemistry and Technology of Petroleum (Chemical Industries) Marcel Dekker, 3rd Rev edition, Apr. 1999, ISBN: 0824702174.*

Miller, Jeffrey et al., A Comparison of Alternative Forecasting Strategies for Multi Stage Production Inventory Systems Decision Sciences, Oct. 1976, vol. 7, No. 4.*

Lescher, Fritz, Making Your Enterprise Internet-Ready: E-Business for the Process Industries ASCET, Apr. 15, 2000.*

Banker, Steve et al., AspenTech Expands Oil & Gas Solution ARCInsights, Jun. 7, 2000.*

Apen Technology launches PetroVantage—the first collaborative digital marketplace for the pertrolem industry M2 Presswire, Sep. 15, 2000.*

Aspen Technology Delivers Aspen Bulk, the First Petroleum-Specific Planning and Scheduling Solution for Primary Distribution e-consultancy.com, Nov. 14, 2000.*

Eichmann, Don, Creating a High-Performance Downstream Petroleum Supply Chain ASCET, Apr. 15, 2000.*

Plantelligence in the Chemical Process Industry, unknown date.*

Aspen Announces Availability of eSupply Chain Suite to Optimize Flow of Knowledge and Materials for Process Manufacturing Industries, PR Newswire, Aug. 3, 2000.*

Hydrocarbon Processing's Advanced Control and Information Systems '99 Hydrocarbon Processing, Sep. 1999, vol. 78, No. 9.*

Baan's Commitment to Process Industry Marked by New Functionality, Solution Centers and Partners PR Newswire, Feb. 10, 1997.*

Aspen Technology's e-Business Solution Lets Petroleum Companies Manage Consumer Demand, Fulfillment in Real Time PR Newswire, Nov. 14, 2000.*

Weitzel, Dale, How to manage your refinning supply chain from E-to-E World Refining, Dec. 31, 2000, vol. 10, No. 10.*

AspenTech.com Web Pages Aspen Technology, Jun.-Dec. 2000, Retrieved from Archive.org Dec. 12-13, 2005.*

Bodington, C.E. Baker et al., A History of Mathematical Programming in the Petroleum Industry Interfaces, Jul./Aug. 1990, vol. 20, No. 4, Abstract.*

Fransoo, Jan Cornelis, Production control and demand management in capcitated flow process industries Technische universiteit Eindhoven, 1993, AAT C320771, Abstract.*

Petrolsoft Introduces Wholesales Supply-Chain Planning Solution for Refinery-to-Terminal Distribution Business Wire, Aug. 1, 1999.*

Dempster et al., Planning logistics operations in the oil industry Journal of Operational Research Society, 2000, vol. 51, pp. 1271-1288.*

Process Industry Modeling System (PIMS) Training Manual—Part 1 Aspen Technology, Inc. Jun. 1, 1998.*

Process Industry Modeling System (PIMS) Training Manual—Part 2 Aspen Technology, Inc. Jun. 1, 1998.*

* cited by examiner

SYSTEM AND METHOD OF DEMAND PLANNING FOR INTERMEDIATE AND BY-PRODUCTS

TECHNICAL FIELD OF THE INVENTION

This invention relates generally to the field of planning, and more particularly to a system and method for demand planning using sequential forecasting.

BACKGROUND OF THE INVENTION

In the manufacturing industry, the production of finished end products often involves the production and use of intermediate products and by-products. Raw materials are processed into an intermediate product, possibly generating one or more by-products, and the intermediate product is then processed into the finished end product, possibly generating one or more additional by-products. For example, to produce foam seating cushions, a manufacturer may combine two raw materials, an amine and a phosgene. This produces isocyanate, an intermediate product, and hydrochloric acid, a by-product. The isocyanate is then processed further to form the foam cushions.

In addition to selling finished end products, manufacturers also often attempt to sell intermediate products and by-products to other manufacturers or enterprises. This may provide additional sources of revenue. As another example, because a by-product may be a hazardous material, government regulations may prohibit the manufacturers from dumping or burning the by-product. Despite their desire to do so, many manufacturers have difficulty producing a consistent revenue stream or otherwise disposing of their intermediate products and/or by-products because they typically cannot predict customer demand for those products. Instead, the manufacturers routinely sell those products by turning the market for the products "on" and "off." For example, when a manufacturer's quantity of a by-product is low, the manufacturer may charge an artificially high price for the by-product. This turns the market "off," such that few if any customers are willing to purchase the by-product from the manufacturer. When the quantity of the by-product is high, the manufacturer may charge an artificially low price for the by-product. This turns the market "on," such that many customers are willing to purchase the by-product from the manufacturer.

A problem with this approach is that the manufacturers often end up selling their intermediate products or by-products at very low prices. Because the manufacturers view customer demand for the intermediate products or by-products as highly variable, the manufacturers simply wait until the need arises and then sell these products at artificially low prices. This prevents the manufacturers from charging more reasonable prices for the intermediate products or by-products. As a result, the manufacturers often lose money in those sales, either relative to what they could have charged had they acted sooner or possibly even in absolute terms (relative to the cost of generating the intermediate products or by-products).

Another problem with this approach is that the manufacturers often do not record how different prices or contract terms affect the market for the intermediate products and by-products. The lack of recorded information often prevents the manufacturers from engaging in statistical analysis of future demand for these products, such that they cannot predict the level of customer demand for the intermediate product or by-product with any certainty. As a result, any estimates of future demand for these products often suffer from high rates of forecast error, indicating that the manufacturers often over-estimate or under-estimate the demand for these products.

In addition, the lack of accurate demand forecasts may prevent the manufacturers from running their manufacturing facilities at full capacity. Manufacturers can typically predict the demand for their finished end products, so they typically use their facilities to produce enough of the finished end product to satisfy that predicted demand. If their facilities are not running at full capacity, the manufacturers could potentially use the excess capacity to produce additional amounts of the intermediate products and by-products. However, because the manufacturers often cannot predict the demand for the intermediate products and by-products, the manufacturers may choose not to use such excess capacity in order to avoid possibly generating excess amounts of those products that then need to be disposed of in some manner. Instead, the manufacturers may run their manufacturing facilities at less than peak capacity, which reduces the amount of product that can be sold and increases the length of time it takes to recover the costs of the equipment in the facilities.

As a result of any of these or other disadvantages, previous demand planning techniques have been inadequate in many manufacturing environments.

SUMMARY OF THE INVENTION

According to the present invention, problems and disadvantages associated with previous demand planning techniques have been substantially reduced or eliminated.

According to one embodiment of the present invention, a system for demand planning includes memory containing a value representing a demand quantity of at least one end product that a manufacturer is to produce. Production of the demand quantity of the end product includes production of a quantity of at least one intermediate product that is to be further processed to produce the end product. The system also includes one or more processors collectively operable to determine a value representing an additional quantity of the intermediate product that the manufacturer can produce in addition to the quantity of the intermediate product used to produce the end product. The one or more processors are also collectively operable to make the additional quantity value for the intermediate product available for use in generating additional demand for the intermediate product.

In another embodiment of the invention, a system for demand planning includes memory containing a value representing a demand quantity of at least one end product that a manufacturer is to produce. Production of the demand quantity of the end product includes production of at least one by-product that is not to be further processed to produce the end product. The system also includes one or more processors collectively operable to determine a value representing a quantity of the by-product that would be produced during production of the end product. The one or more processors are also collectively operable to make the quantity value for the by-product available for use in generating additional demand for the by-product.

Numerous technical advantages are provided according to various embodiments of the present invention. Particular embodiments of the invention may exhibit none, some, or all of the following advantages. For example, the present invention may allow a manufacturer to earn more money through the sale of intermediate products and by-products. The system allows a manufacturer to more accurately predict the amounts of intermediate products and/or by-products that can be produced in a given time period. Using this improved forecast, the manufacturer may then, for example, use its sales and marketing personnel to generate demand for appropriate amounts of the intermediate product and by-product. Rather than being forced to sell the intermediate product or by-product at very low prices, the manufacturer may set more profitable prices or obtain other more favorable contract terms for the sale of those products.

The present invention may also provide a more reliable approach to selling the intermediate products or by-products. The system allows a manufacturer to monitor how different prices or other contract terms affect the market for those products. The recorded information allows the manufacturer to engage in statistical analysis to more accurately forecast future demand for the intermediate products and by-products. As a result, the manufacturer is less likely to over-estimate or under-estimate the demand for those products, which helps lead to more accurate demand planning and reduces forecast error. This may also help to improve relations between the manufacturer and its customers. Because the manufacturer can more accurately forecast future demand for the intermediate products and corresponding by-products, the manufacturer may provide a more predictable supply of these products to its customers. A customer may not run the risk that, at a time when the customer needs an intermediate product or by-product, many if not all of the manufacturers are selling these products at artificially high prices. Also, the customer may not need to constantly monitor the market to identify manufacturers who are selling the intermediate product or by-product at extremely low prices.

The present invention may allow a manufacturer to run its manufacturing facilities at a higher capacity. The manufacturer may more accurately forecast future demand for the intermediate products and/or by-products. In particular, the manufacturer can more accurately forecast the amount of additional intermediate product that can be produced and sold, as well as the amount of corresponding by-product that will be produced as a result and will need to be sold. As a result, if the manufacturer's facilities are not running at full capacity, the manufacturer can use those facilities to produce additional quantities of the intermediate product and by-product. Because the manufacturer may more accurately forecast future demand for the intermediate products and feel confident that it can sell at least some of the additional corresponding by-products produced, the manufacturer may operate its facilities at a higher capacity and produce additional amounts of those products. This increases the amount of product that can be sold and decreases the length of time it takes to recover the costs of the equipment in the facility.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which.

DETAILED DESCRIPTION OF THE INVENTION

Figure 1:
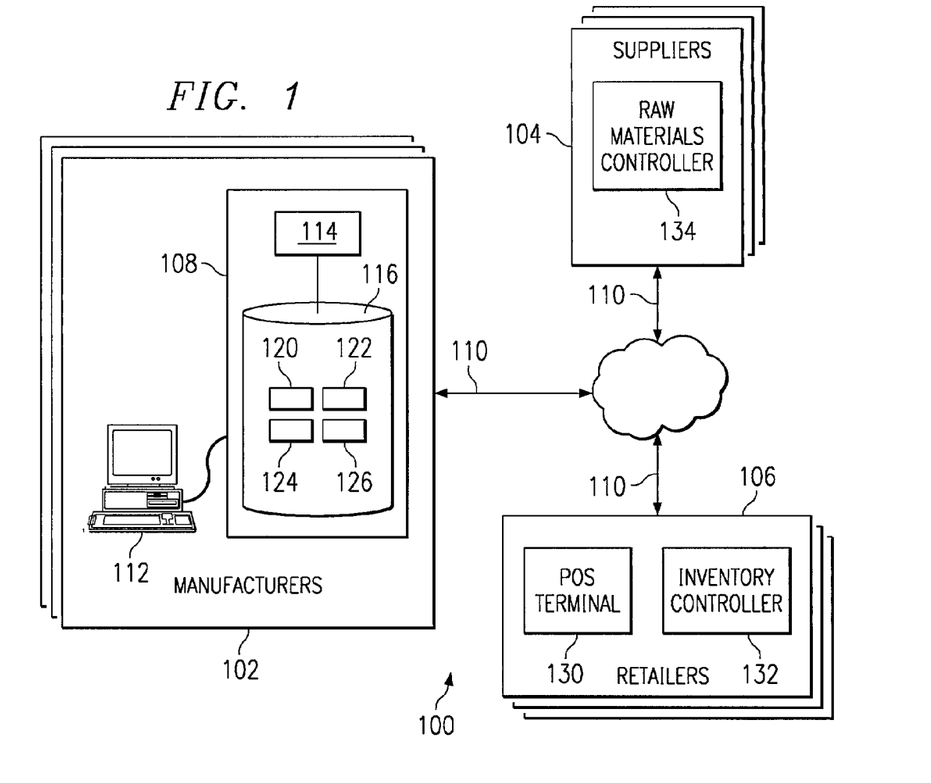
FIG. 1 illustrates an exemplary system for demand planning using sequential forecasting.

FIG. 1 illustrates an exemplary system 100 for demand planning using sequential forecasting. System 100 includes one or more manufacturers 102, one or more suppliers 104, and one or more retailers 106. Other embodiments of system 100 may be used without departing from the scope of the present invention.

Manufacturer 102 may be any suitable entity that manufactures at least one end product. Manufacturer 102 may use one or more intermediate products during the manufacturing process to produce the end product, and may produce one ore more by-products during the manufacturing process in producing the end product. In this document, the phrase "end product" refers to any manufactured or processed product, the phrase "intermediate product" refers to any product produced during the manufacturing process and which is further processed to produce the end product, and the phrase "by-product" refers to any product produced during the manufacturing process and which is not further processed to produce the end product. A manufacturer 102 may, for example, produce and sell an end product, an intermediate product, or a by-product to another manufacturer 102, a supplier 104, a retailer 106, or other suitable person or enterprise. A supplier 104 may be any suitable entity that offers to sell raw materials to manufacturers 102. A retailer 106 may be any appropriate entity that purchases an end product, an intermediate product, or a by-product from manufacturer 102 to sell to its own customers. Although FIG. 1 illustrates manufacturers 102, suppliers 104, and retailers 106 as separate and distinct entities, the same person or enterprise could simultaneously act as a manufacturer 102, a supplier 104, and/or a retailer 106. For example, an enterprise acting as a manufacturer 102 could produce an end product, and the same enterprise could act as a supplier 104 to supply an intermediate product to another manufacturer 102.

Manufacturers 102, suppliers 104, and retailers 106 may be coupled to one another using links 110. Links 110 may each include one or more local area networks (LANs), metropolitan area networks (MANs), wide area networks (WANs), a portion of the global computer network known as the Internet, or any other appropriate wireline, wireless, or other links. In this document, the term "couple" refers to any direct or indirect communication between two or more elements in system 100, whether or not those elements are in physical contact with one another.

In the illustrated embodiment, manufacturer 102 includes a demand server 108. In general, demand server 108 receives information concerning demand for an end product that is produced by manufacturer 102. Based on this and any other appropriate information, demand server 108 determines whether manufacturer 102 has the ability to produce additional amounts of one or more intermediate products used in producing the end product, in addition to the amounts of these intermediate products used to manufacture the end product. Demand server 108 also determines the amount of one or more by-products that manufacturer 102 will produce when manufacturing the end product and the one or more additional intermediate products. The amounts of the additional intermediate products and by-products can be sold, for example, to other manufacturers 102, suppliers 104, retailers 106, or any other suitable persons or enterprises. Manufacturer 102 may use the information generated by demand server 108, for example, to negotiate sales contracts with its customers. By more accurately identifying the amounts of the additional intermediate products and by-products produced by manufacturer 102, manufacturer 102 may negotiate more favorable contract terms, such as receiving a higher price for the products.

Demand server 108 may include one or more processors 114 and a memory 116. Memory 116 may comprise any of a variety of data structures, arrangements, and/or compilations operable to store and facilitate retrieval of information. Memory 116 may, for example, comprise one or more volatile or non-volatile memory devices. Although FIG. 1 illustrates memory 116 as residing within demand server 108, memory 116 may reside in any location that is accessible by processor 114. Memory 116 receives and stores information related to demand planning operations for manufacturer 102, such as information related to the production of one or more end products, one or more intermediate products, and one or more by-products by manufacturer 102. Processor 114 processes information stored in memory 116 and performs demand planning operations for manufacturer 102.

Memory 116 may store and processor 114 may process any suitable information to perform demand planning operations in system 100. The following examples are for illustration only. Any other suitable type of information may be used in system 100 without departing from the scope of the present invention. Also, although the following description describes demand server 108 receiving information electronically from various sources, other collection methods may be used. For example, a user could enter the data manually into demand server 108 using a workstation, personal computer, or any other suitable user device 112.

In one embodiment, memory 116 stores manufacturing information 120 that describes the manufacturing process used to produce an end product. Manufacturing information 120 may identify, for example and without limitation, one or more raw materials used to begin production of the end product, the processing steps used to transform the raw materials into one or more intermediate products, the processing steps used to transform the one or more intermediate products into the end product, one or more by-products produced in producing the end product or one or more intermediate products, the amounts of intermediate product and by-product produced for a given amount of raw materials, and any other suitable manufacturing information.

Memory 116 may also store end product demand information 122 that can be used to determine a demand quantity of an end product, which represents the predicted future demand for the end product. For example, in one embodiment, demand server 108 may predict the future demand for an end product using historical, current, or projected end product orders received from other manufacturers 102, suppliers 104, and retailers 106. Demand server 108 could also predict the future demand for an end product using information from retailers 106. In this embodiment, end product demand information 122 may include sales information collected from one or more point of sale (POS) terminals 130 associated with one or more retailers 106 or otherwise. End product demand information 122 could further include sales information collected from one or more inventory controllers 132 associated with one or more retailers 106, where the inventory controller 132 predicts future sales of a product for a retailer 106 and transmits that prediction to demand server 108. Demand server 108 could further predict the future demand for an end product using information about the raw materials used to produce the end product. In this embodiment, end product demand information 122 could include information about the availability of raw materials provided by suppliers 104. For example, demand server 108 could receive information about the future availability of one or more raw materials from one or more raw materials controllers 134 associated with one or more suppliers 104. In addition, end product demand information 122 could include sales histories of the end product, price histories of the end product, information concerning related products, or any other suitable information that may be used to predict the demand for an end product.

Memory 116 may further store intermediate product information 124. In one embodiment, a manufacturer 102 may sell an end product as well as one or more intermediate products used to produce that end product. Intermediate product information 124 may include information that can be used to determine the potential demand for an intermediate product. In one embodiment, intermediate product information 124 could include information about how much additional intermediate product may be produced during a particular time period. This may include, for example, information identifying a maximum amount of the intermediate product that can be produced by the manufacturer 102. This may also include information identifying a reserve amount of the intermediate product, which represents the amount of the intermediate product needed to meet the predicted demand for the end product. Further, intermediate product information 124 could include sales histories of the intermediate product, price histories of the intermediate product, or any other suitable information that may be used to predict the availability of or demand for one or more intermediate products.

In addition, memory 116 may store by-product information 126. In one embodiment, a manufacturer 102 may sell an end product and one or more intermediate products, as well as one or more by-products produced during the manufacture of the end product and the one or more intermediate products. By-product information 126 may be used to determine the potential demand for the by-product. In one embodiment, by-product information 126 could include information identifying how much by-product will be produced during a particular time period. This may include, for example, information identifying an amount of the by-product that will be produced during the production of the end product. This may also include information identifying an amount of the by-product that will be produced during the production of at least a portion of the additional intermediate product that is produced and not used to manufacture the end product. In addition, by-product information 126 could include sales histories of the by-product, price histories of the by-product, or any other suitable information that may be used to predict the demand for or availability of one or more by-products.

In operation, demand server 108 performs demand planning operations using sequential forecasting, which refers to a sequence of steps or calculations used to predict demand for one or more intermediate products, one or more by-products, or both. For example, in one embodiment, demand server 108 stores manufacturing information 120, which identifies the amounts of one or more intermediate products and the amounts of one or more by-products that are produced for a given amount of an end product. Demand server 108 uses end product demand information 122 to predict the future demand for the end product. Based on the predicted demand for the end product, demand server 108 uses manufacturing information 120 and intermediate product information 124 to determine whether additional amounts of one or more intermediate products can be produced and, if so, in what amounts. Instead or in addition, demand server 108 uses manufacturing information 120 and by-product information 126 to determine the amounts of one or more by-products that will be produced during the manufacture of the end product and during the manufacture of at least a portion of the one or more additional intermediate products.

Although system 100 is primarily described as determining the amounts of both intermediate products and by-products that can be produced in a given time period, other embodiments may be used without departing from the scope of the present invention. For example, system 100 could determine the amounts of one or more intermediate products that can be produced by a manufacturer 102, without determining the amounts of one or more by-products produced. Similarly, system 100 could determine the amounts of one or more by-products that can be produced by a manufacturer 102, without determining the amounts of one or more intermediate products produced.

System 100 allows manufacturer 102 to more accurately predict the amounts of intermediate products and corresponding by-products that can be produced in a given time period. Using this information, manufacturer 102 may, for example, use its sales and marketing resources to generate the demand for appropriate amounts of the intermediate products and by-products. Manufacturer 102 may set more profitable prices or obtain other more favorable contract terms for the sale of those products, rather than being forced to sell the intermediate products or by-products at very low prices. Also, system 100 allows manufacturer 102 to monitor how different prices or other contract terms affect the market for those products. Manufacturer 102 may use this information to more accurately forecast future demand for the intermediate products and by-products, which reduces the likelihood that manufacturer 102 will over-estimate or under-estimate the demand for these products and improves relations between manufacturer 102 and its customers. In addition, manufacturer 102 may be able to run its manufacturing facilities at a higher capacity. Using the improved forecast, if manufacturer 102 is not operating its facilities at full capacity, manufacturer 102 can use those facilities to produce additional quantities of the intermediate products and by-products. This increases the amount of product that can be sold and decreases the length of time it takes to recover the costs of the equipment in the facility.

Although FIG. 1 illustrates an exemplary embodiment of system 100, various changes may be made without departing from the scope of the present invention. For example, the components of demand server 108 may operate on one or more computers at one or more locations. Although demand server 108 is described primarily as being separate from suppliers 104 and retailers 106, demand server 108 may share one or more computer or other appropriate resources with one or more suppliers 104 or retailers 106 according to particular needs. Also, although demand server 108 is primarily described as receiving information 120–126 electronically, information 120–126 may also be provided directly to demand server 108 by a user. In addition, the functionality of demand server 108 may be implemented on any computing device or devices, such as a desktop computer, a laptop computer, or a personal digital assistant. Other changes may be made to system 100 without departing from the scope of the present invention.

Figure 2:
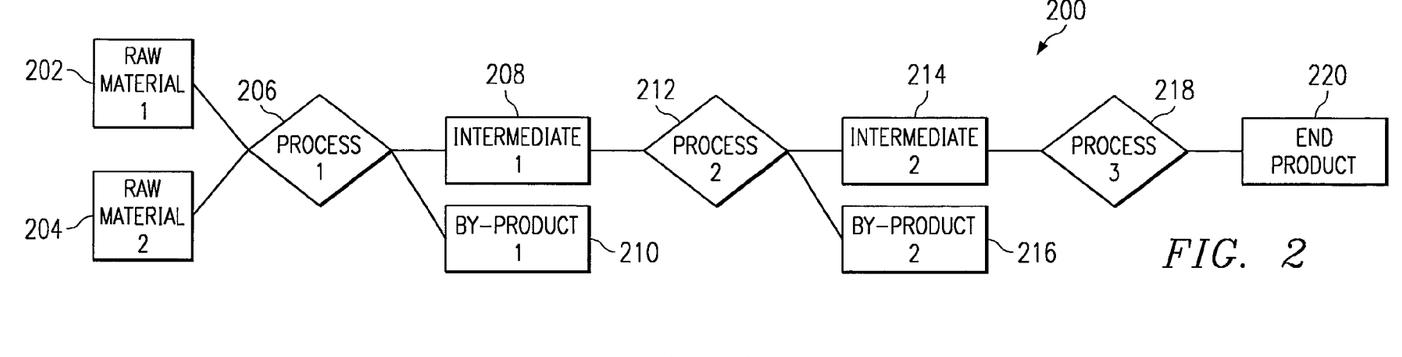
FIG. 2 illustrates exemplary processing steps of a manufacturer.

FIG. 2 illustrates exemplary processing steps 200 of a manufacturer 102. The steps illustrated in FIG. 2 represent the processing steps used to transform two raw materials 202 and 204 into an end product 220. The steps illustrated in FIG. 2 are for illustration only. A manufacturer 102 may use any suitable process to manufacture an end product 220.

Raw materials 202 and 204 are combined in a first process 206 into a first intermediate product 208. As a result of process 206, a first by-product 210 also forms. The first intermediate product 208 undergoes a second process 212 and is formed into a second intermediate product 214. A second by-product 216 is also formed during the second process 212. The second intermediate product 214 undergoes a third process 218 and is formed into end product 220.

A manufacturer 102 that performs process 200 may use system 100 to analyze the potential demand for intermediate products 208 and 214 and/or by-products 210 and 216. System 100 may, as just an example, determine that the manufacturer 102 possesses the manufacturing capacity to produce additional quantities of the first intermediate product 208. This excess quantity of the first intermediate product 208 could be sold to other manufacturers 102, suppliers 104, retailers 106, or any other persons or enterprises. System 100 may also, as just an example, determine the amount of by-product 210 that will be produced during the production of end product 220 and during the production of the excess intermediate product 208. The manufacturer 102 may use its sales and marketing resources to generate demand for the intermediate product 208 that is equal to or less than the amount of excess intermediate product 208 identified by system 100. The manufacturer 102 may also use its sales and marketing resources to generate demand for the by-product 210 that is equal to or less than the amount of by-product 210 identified by system 100.

As a more particular example, raw material 202 may include a silicon metal, and raw material 204 may include a methyl chloride. First process 206 combines the silicon metal and the methyl chloride to form an intermediate product 208, dimethyl dichlorosilane, and several by-products 210, including trichlorosilane. Second process 212 hydrates the first intermediate product 208 and forms a second intermediate product 214, hydrolyzate, and a second by-product 216, hydrochloric acid. The second by-product 216 may be recycled in the process 200, for example, by using it to form additional amounts of raw material 204. Third process 218 polymerizes the second intermediate product 214 to form an end product 220, dimethyl fluids.

A manufacturer 102 may choose to sell the end product 220, dimethyl fluids, to other manufacturers 102, suppliers 104, or retailers 106. System 100 may determine that the manufacturer 102 also possesses the ability to produce additional amounts of the first intermediate product 208, dimethyl dichlorosilane. This excess intermediate product 208 can also be sold to other manufacturers 102, suppliers 104, or retailers 106. In addition, system 100 may determine the amount of by-product 210 that will be produced during the production of end product 220 and during the production of the excess intermediate product 208. The manufacturer 102 may use its sales and marketing resources to generate a demand for the first intermediate product 208, dimethyl dichlorosilane, that is equal to or less than the amount of excess intermediate product 208 determined by system 100. The manufacturer 102 may also use its sales and marketing resources to generate demand for by-product 210, the trichlorosilane, that is equal to or less than the amount of by-product 210 identified by system 100. To prevent a build-up of by-product 210, the manufacturer 102 may attempt to sell all of the by-product 210 that will be produced during a given time period.

Although the example described above involves a chemical process, system 100 could be used with respect to any process-oriented industry. As examples and without limitation, system 100 could be used in the metal processing industry, the food processing industry, or the glass processing industry. Also, while FIG. 2 illustrates one exemplary series of processing steps, any other suitable processing steps may be performed by a manufacturer 102 without departing from the scope of the present invention. For example, manufacturer 102 may produce intermediate products 208 and 214, without producing by-products 210 and 216. As another example, manufacturer 102 may combine two raw materials 202 and 204 to produce an end product 220 and a by-product 210, without producing any intermediate products 208 and 214.

Figure 3:
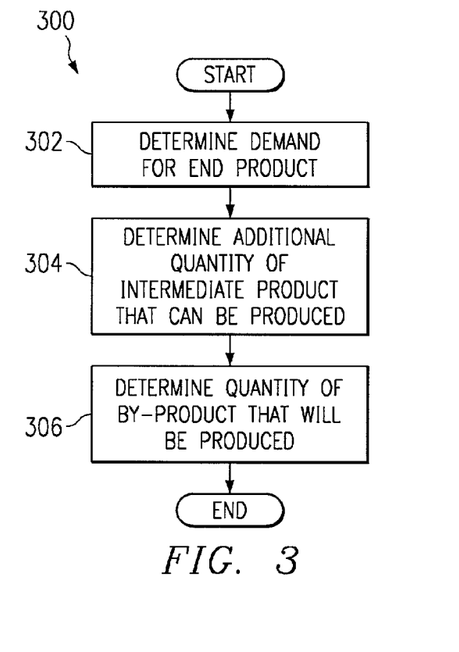
FIG. 3 illustrates an exemplary method for demand planning using sequential forecasting.

FIG. 3 illustrates an exemplary method 300 for demand planning using sequential forecasting. The method 300 beings at step 302, where system 100 determines a demand for an end product. This may include, for example, demand server 108 receiving information from one or more POS terminals 130, inventory controllers 132, raw materials controllers 134, system operators using devices 112, or any other suitable sources of information. This may also include demand server 108 predicting the expected future demand for the end product, using any suitable technique.

At step 304, system 100 determines an additional quantity of an intermediate product that can be produced. This may include, for example, demand server 108 determining the total amount of the intermediate product that manufacturer 102 can produce. This may also include demand server 108 determining an amount of the intermediate product needed to meet the predicted demand for the end product. Although method 300 is described as involving a single intermediate product, method 300 may involve any number of intermediate products according to particular needs.

At step 306, system 100 determines a quantity of a by-product that will be produced. This may include, for example, demand server 108 determining an amount of the by-product that will be produced during the production of the end product. This may also include demand server 108 determining an amount of the by-product that will be produced during the production of at least a portion of the additional intermediate product described above with reference to step 304. Although method 300 is described as involving a single by-product, method 300 may involve any number of by-products according to particular needs.

The manufacturer 102 may use its sales and marketing resources to generate demand for the intermediate product that is equal to or less than the amount determined at step 304. Instead or in addition, the manufacturer 102 may use its sales and marketing resources to generate demand for the by-product that is equal to or less than the amount determined at step 306.

Although method 300 shows determining the amounts of both intermediate products and by-products that can be produced in a given time period, other embodiments may be used without departing from the scope of the present invention. For example, system 100 could determine the amounts of one or more intermediate products that can be produced by a manufacturer 102 without determining the amounts of one or more by-products.

Figure 4:
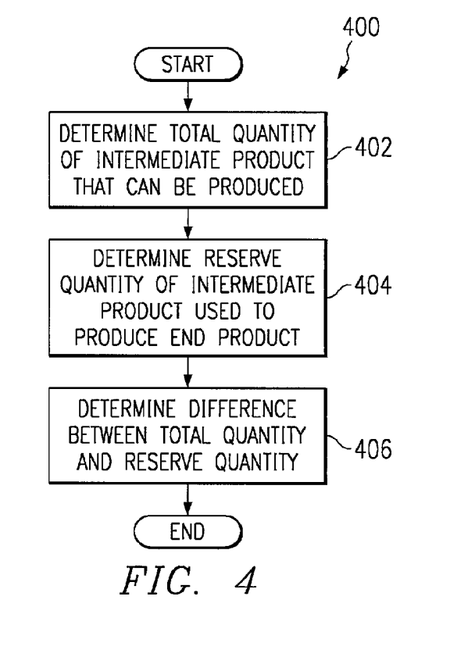
FIG. 4 illustrates an exemplary method for identifying predicted demand for an intermediate product.

FIG. 4 illustrates an exemplary method 400 for identifying predicted demand for an intermediate product. The method 400 begins at step 402, where system 100 determines a total quantity of an intermediate product that can be produced by manufacturer 102. This may include, for example, demand server 108 using manufacturing information 120 to determine how much of the intermediate product can be produced in a given time period. At step 404, system 100 determines a reserve quantity of the intermediate product. The reserve quantity represents the amount of the intermediate product that will be used to produce the end product. Demand server 108 may, for example, use the manufacturing information 120 and the predicted demand for the end product to determine the reserve amount. At step 406, system 100 determines a difference between the total quantity and the reserve quantity of the intermediate product. The difference represents the excess amount of the intermediate product that manufacturer 102 can produce. The excess amount of the intermediate product can be sold to other manufacturers 102, suppliers 104, retailers 106, or any other persons or enterprises. Accordingly, the manufacturer 102 may use its sales and marketing resources to generate demand for the intermediate product that is equal to or less than the amount determined at step 406. Method 400 may be performed for one or more intermediate products serially, simultaneously, or otherwise.

Figure 5:
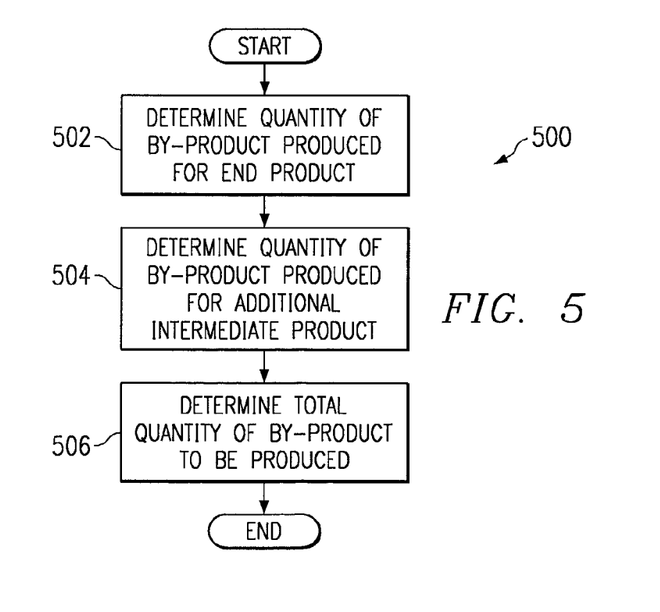
FIG. 5 illustrates an exemplary method for identifying predicted demand for a by-product.

FIG. 5 illustrates an exemplary method 500 for identifying predicted demand for a by-product. The method 500 begins at step 502, where system 100 determines a quantity of the by-product that will be produced during production of the end product at step 502. This may include, for example, demand server 108 using manufacturing information 120 and the predicted demand for the end product to determine the amount of the by-product that will be produced. At step 504, system 100 determines a quantity of the by-product that will be produced during production of at least a portion of the excess intermediate product. This may include, for example, demand server 108 using manufacturing information 120 and the predicted amount of excess intermediate product to determine the amount of the by-product that will be produced. System 100 determines a total quantity of the by-product that will be produced by manufacturer 102 at step 506. This may include, for example, demand server 108 summing the first amount determined at step 502 and the second amount determined at step 504. The value represents the total amount of the by-product that will be produced by manufacturer 102, and this amount of the by-product can be sold to other manufacturers 102, suppliers 104, retailers 106, or any other persons or enterprises. Accordingly, the manufacturer 102 may use its sales and marketing resources to generate demand for the by-product that is equal to or less than the total amount. Method 500 may be performed for one or more by-products serially, simultaneously, or otherwise.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A computer-implemented system for manufacturing forecasting, the system comprising one or more memory units and one or more processing units operable to:

store, in one or more of the memory units, end product demand information representative of a predicted future demand for an end product, and intermediate product information representative of an amount per time period of an intermediate product that can be produced and intermediate product demand information representative of a predicted future demand for the intermediate product;

determine, based on the end product demand information, a demand quantity of the end product that a manufacturer is to produce during a specified time period to satisfy the predicted future demand, wherein production of the demand quantity of the end product requires producing a first intermediate-product quantity of an intermediate product that is further processed to produce the demand quantity of the end product, and requires producing a first by-product quantity of a by-product;

determine, based on the intermediate product information and the demand quantity, a second intermediate-product quantity of the intermediate product that the manufacturer can produce during the specified time period in addition to the first intermediate-product quantity, wherein production of the second-intermediate-product quantity requires producing a second by-product quantity;

determine, based on the second intermediate-product quantity and the intermediate product demand information, whether to produce any of the second intermediate-product quantity of the intermediate product; and determine, based on the demand quantity of the end product and the second intermediate-product quantity, a total by-product quantity of the by-product that the manufacturer can produce during the specified time period.

2. The system of claim 1, wherein the end product comprises a chemical end product, the intermediate product comprises a chemical intermediate product, and the by-product comprises a chemical by-product.

3. The system of claim 1, wherein the one or more processing units are further operable to store, in the one or more memory units, by-product information representative of a total amount of by-product that can be produced during the specified time period.

4. The system of claim 1, wherein the one or more processing units are further operable to store, in the one or more memory units, by-product information identifying an amount of a by-product that will be produced during production of the end product.

5. A computer-implemented method of manufacturing forecasting, the method being performed using a computer system comprising one or more memory units and one or more processing units, the method comprising:

storing, in one or more of the memory units, end product demand information representative of a predicted future demand for an end product, and intermediate product information representative of an amount per time period of an intermediate product that can be produced and intermediate product demand information representative of a predicted future demand for the intermediate product;

using the computer system to determine, based on the end product demand information, a demand quantity of the end product that a manufacturer is to produce during a specified time period to satisfy the predicted future demand, wherein production of the demand quantity of the end product requires producing a first intermediate-product quantity of an intermediate product that is further processed to produce the demand quantity of the end product, and requires producing a first by-product quantity of a by-product;

using the computer system to determine, based on the intermediate product information and the demand quantity, a second intermediate-product quantity of the intermediate product that the manufacturer can produce during the specified time period in addition to the first intermediate-product quantity, wherein production of the second-intermediate-product quantity requires producing a second by-product quantity;

using the computer system to determine, based on the second intermediate-product quantity and the intermediate product demand information, whether to produce any of the second intermediate-product quantity of the intermediate product; and using the computer system to determine, based on the demand quantity of the end product and the second intermediate-product quantity, a total by-product quantity of the by-product that the manufacturer can produce during the specified time period.

6. The method of claim 5, wherein the end product comprises a chemical end product, the intermediate product comprises a chemical intermediate product, and the by-product comprises a chemical by-product.

7. The method of claim 5, further comprising storing, in the one or more memory units, by-product information representative of an amount of by-product that can be produced during the specified time period.

8. The method of claim 5, further comprising storing, in the one or more memory units, by-product information identifying an amount of a by-product that will be produced during production of the end product.

9. A computer-readable medium having encoded thereon software for manufacturing forecasting, said software including instructions for executing the steps of:

storing, in one or more of the memory units, end product demand information representative of a predicted future demand for an end product, and intermediate product information representative of an amount per time period of an intermediate product that can be produced and intermediate product demand information representative of a predicted future demand for the intermediate product;

using the computer system to determine, based on the end product demand information, a demand quantity of the end product that a manufacturer is to produce during a specified time period to satisfy the predicted future demand, wherein production of the demand quantity of the end product requires producing a first intermediate-product quantity of an intermediate product that is further processed to produce the demand quantity of the end product, and requires producing a first by-product quantity of a by-product;

using the computer system to determine, based on the intermediate product information and the demand quantity, a second intermediate-product quantity of the intermediate product that the manufacturer can produce during the specified time period in addition to the first intermediate-product quantity, wherein production of the second-intermediate-product quantity requires producing a second by-product quantity;

using the computer system to determine, based on the second intermediate-product quantity and the intermediate product demand information, whether to produce any of the second intermediate-product quantity of the intermediate product; and using the computer system to determine, based on the demand quantity of the end product and the second intermediate-product quantity, a total by-product quantity of the by-product that the manufacturer can produce during the specified time period.

10. The computer-readable medium of claim 9, wherein the end product comprises a chemical end product, the intermediate product comprises a chemical intermediate product, and the by-product comprises a chemical by-product.

11. The computer-readable medium of claim 9, wherein the software further includes instructions for storing, in the one or more memory units, by-product information representative of a total amount of by-product that can be produced during the specified time period.

12. The computer-readable medium of claim 9, wherein the software further includes instructions for storing, in the one or more memory units, by-product information identifying an amount of a by-product that will be produced during production of the end product.

* * * * *